Patented Aug. 22, 1939

2,170,272

UNITED STATES PATENT OFFICE 2,170,272

STARCH COMPOSITION

James F. Walsh, Chicago, Ill., and Willard L. Morgan, Cranston, R. I., assignors to American Maize-Products Company, a corporation of Maine No Drawing. Application March 5, 1938,
Serial No. 194,173

8 Claims. (Cl. 127—33)

Our invention relates to starch compositions and more particularly to starch compositions in which chemical thinning agents are used to reduce the viscosity of the starch when made into a paste, thereby permitting a greater starch solids content in the paste at a desired consistency.

As is well known to those skilled in this art two of the largest uses of starch are, as a textile sizing and as a base for paper coating. In both of these uses it is desirable to apply the largest amount of starch possible on the fibrous materials in one treatment. Also, in the filling and coating of paper with starch it is highly desirable that the starch solution have a minimum water content since this water must be removed subsequently by drying the coated or impregnated paper stock. If the starch is of such a nature as to require large quantities of water the expense of the processing is increased and the treated material is subject to wrinkling during the prolonged or intense drying treatment. It is therefore desirable that coating and impregnating starch solutions should have a maximum starch solids content and a minimum water content. This optimum type of product however is limited by the viscosity of the starch paste, which must be sufficiently thin to be easily applied and flow smoothly on the coated material.

The common type of starch without any modifying treatment gives very thick suspensions when heated with hot water in the proportions of as little as one part of starch to 17 parts of water. This is considered in the industry as a low solids content, but without modification of the starch this proportion cannot be exceeded and the starch still remain sufficiently fluid for the treatment of textiles and paper. In view of this limitation, various attempts have been made to so treat or modify the common starch that its consistency when pasted with hot water in the above named or greater proportions of starch will be diminished; the primary purpose being to use as much starch as possible and as little water as possible. The treatments of starch heretofore proposed for this purpose produce generally the products known as thin boiling starches, roasted starches, or dextrins, oxidized starches and starches treated with enzymes. These are examples of the modified starches referred to herein and other similar modified forms of starches resulting from treatment with acids, alkalis and enzymes are also contemplated. The thin boiling starches are generally produced by treating a common starch with acid. The cost of manufacture of these thin boiling starches is relatively high and their commercial use has therefore been limited. The roasted starches or dextrins, although permitting a rather high solids content in the starch solutions have been limited in use because of their tendency to stickiness and also because of the poor strength of the films produced from these starches.

At the present time the most satisfactory modified starches for paper and textile use are those which have been slightly modified by treatment with certain oxidizing agents, particularly hypochlorites. These starches technically are satisfactory for use in paper but in their preparation a considerable amount of starch is lost as cold water soluble products. Furthermore, relatively large amounts of the oxidizing agent are required for preparation of the starches so that these starches are considerably more expensive than the ordinary common starch. The enzyme treated starches produce a starch paste suspension of high solids content and yet sufficiently thin to be used in the paper industry, but the treatment of these starches with enzymes so increases their cost that commercial use of the same is restricted.

In view of the substantial difference in cost between common starch and the specially treated starches described above there has been a desire in the starch industry for a common starch product which would permit the use of a high solids content in the starch paste suspensions and would automatically thin itself sufficiently when made into a paste that the latter could be easily and effectively used in the paper and textile trades.

An object of our invention is to provide a starch composition which will permit a maximum solids content in paste made therefrom with a minimum amount of water.

We have discovered in accordance with our invention that ordinary common starch in unmodified form may be made to fulfill advantageously all of the requirements of the paper and textile industries if the starch is admixed with certain solid acid salts of amino acids or substituted amino acids, or certain solid acid salts of amides. For purposes of classification the acid salts of amides are disclosed and claimed in our co-pending application Serial No. 194,172, filed March 5, 1938, the salts of the amino acids and substituted amino acids being covered in this application.

The suitable acid salts of the amino acids or substituted amino acids, may be mixed with the starch in dry form to provide a composition which when mixed with water and heated to form a paste will automatically cause a rapid thinning action such that a starch paste of maximum starch solids content with a minimum amount of water may be obtained. These pastes may then be used in conventional manner for impregnating and coating textiles, paper and other materials. Generally the amino acid salts that may be mixed with the starch to accomplish this desired purpose are solid acid salts of amino acids or substituted amino acids, these salts being characterized by the structure $$XNA_2\text{---}CH\text{---}COOH$$
$$|$$
$$R$$

in which A may be either wholly or partly hydrogens or alkyl radicals, R is a hydrogen, aliphatic, or aryl alkyl radical, and X is an acid radical of a strong acid having a dissociation constant of at least $1 \times 10^{-2}$. Examples of suitable strong acids are hydrochloric, nitric, sulphuric, phosphoric and oxalic acid. Other similar strong acids may be used. The various amino acids or substituted amino acids that may be used are of the general type $$NA_2\text{---}CH\text{---}COOH$$
$$|$$
$$R$$

in which A and R may represent the same radicals as stated just above.

Illustrative but nonliimting examples of suitable amino acids and substituted amino acids are as follows:

Glycocol ............ $NH_2CH_2.COOH$

Aspartic acid ........ $NH_2CHCOOH$
$\quad\quad\quad\quad\quad\quad\quad\quad |$
$\quad\quad\quad\quad\quad\quad\quad\quad CH_2.COOH$ Glutamic acid ....... $NH_2.CH.COOH$
$\quad\quad\quad\quad\quad\quad\quad\quad |$
$\quad\quad\quad\quad\quad\quad\quad\quad CH_2.CH_2.COOH$ Lysine .............. $NH_2.CH.COOH$
$\quad\quad\quad\quad\quad\quad\quad\quad |$
$\quad\quad\quad\quad\quad\quad\quad\quad CH_2.CH_2.CH_2.CH_2.NH_2$ Arginine ............ $NH_2.CH.COOH$
$\quad\quad\quad\quad\quad\quad\quad\quad |$
$\quad\quad\quad\quad\quad\quad\quad\quad CH_2.CH_2.CH_2.NH.CNH.NH_2$ Tyrosine ............ $NH_2.CH.COOH$
$\quad\quad\quad\quad\quad\quad\quad\quad |$
$\quad\quad\quad\quad\quad\quad\quad\quad CH_2.C_6H_4OH$ Phenylalanine ....... $NH_2.CH.COOH$
$\quad\quad\quad\quad\quad\quad\quad\quad |$
$\quad\quad\quad\quad\quad\quad\quad\quad CH_2.C_6H_5$ Betaine (substituted amino acid internal anhydride or lactam) ............ 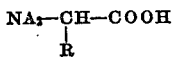

The acid salts of the amino acids and substituted amino acids that we have found advantageous for use in this invention are those made with strong acids such as hydrochloric, nitric, sulphuric, etc., as mentioned above. Illustrative but non-limiting examples of these acid salts are as follows:

Glycocol nitrate ......... $(NH_2.CH_2.COOH).HNO_3$
Aspartic acid sulphate ... $(HO_2C.CH(NH_2)CH_2.CO_2H)_2.H_2SO_4$
Glutamic acid hydrochloride ............. $(HO_2C.CH.NH_2.(CH_2)_2.CO_2H).HCl$
Glutamic acid phosphate . $(HO_2C.CH.NH_2.(CH_2)_2.CO_2H)_3.H_3PO_4$
Betaine hydrochloride .... 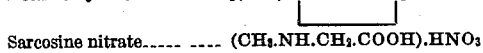

Sarcosine nitrate ........ $(CH_3.NH.CH_2.COOH).HNO_3$

These solid acid salts of amino acids or substituted amino acids, or mixtures thereof such as results from protein hydrolysis, may be blended with the starch in dry form, and in the usual case about 0.5% to 5% by weight of the salts to the weight of the starch will be sufficient to give the necessary thinning action. Where desired, larger amounts of these salts may be used, for example, a practical range is from about 0.5% to 10% and a preferred amount is about 2.5%. In accordance with one illustrative but non-limiting example the starch and salt composition may be made into a satisfactory paste for sizing as follows:

A dry blend of common unmodified starch and 5% betaine hydrochloride is mixed with water in the ratio of 1 part of the starch and salt mixture to 17 parts of water and this water suspension heated to a temperature of about 185° F. or higher for about 5 minutes. The resultant starch paste when tested in an arbitrary viscosity test will show a flow of about 200 cc. in a certain length of time. In contrast to this the common starch without this salt or any other thinning agent when mixed in the above proportions and heated and tested in the same manner shows a flow of only 21 cc. in the given unit of time. It is thus apparent that the betaine hydrochloride has a marked effect upon the viscosity of the starch paste solution within a very short time and produces the desired thinning of the starch essential to its use in the textile and paper industries.

As another specific example, if the common starch is mixed with 5% glutamic acid hydrochloride and a paste made using 1 part of this starch composition to 17 parts of water and tested as above it will give a flow of 170 cc.

While some acid may perhaps be liberated from these compounds during the pasting operation it alone would not be a complete explanation of the phenomenal thinning action produced on the starch by the amino acid salts or substituted amino acid salts that we use. These acid salts, which are all solids, may be blended with the starch very easily and the mixture will remain stable, the effect of the salts not taking place until water is added and the suspension heated to form a paste. It is apparent that these salts accomplish a purpose which could not be obtained by use of the strong acids since the latter could not be added to the starch with the formation of a stable and potentially effective mixture before use. We have found it advantageous to use those acid salts of amino acids or substituted amino acids that are fairly water soluble and likewise to use in preparation of these salts, amino acids or substituted amino acids that are also fairly water soluble.

The thinning action on the starch effected by the salts of our invention is very rapid upon pasting the starch composition in hot water, particularly during the first few minutes of pasting at a temperature of about 180° F. This thinning action however continues over a period of time to some extent. It may be stopped so as to form a starch paste of any desired consistency either by cooling the paste in which the thinning action is going on, or by adding an alkali such as sodium carbonate or sodium hydroxide to the paste to neutralize it to a pH value of about 7. While we do not wish to limit our invention to any theoretical explanation we believe that the strong acid salts of the amino acids or substituted amino acids effect in part the desired thinning of the starch paste by action of the salts on the starch cell outer layers.

While it is not necessary to use special starches to accomplish the purposes of our invention or to preliminarily treat the starch in any manner before the amino acid salt is added, it will be understood that the use of these salts is not restricted to their action on common starch. Any of the modified forms of starches heretofore used may be used in conjunction with our amino acid salts or substituted amino acid salts for the purpose of further thinning or modifying these treated starches during the pasting operations.

The amino acids, or substituted amino acids and the salts thereof used in our invention need not be pure. Crude mixtures of these substances derived from protein hydrolysis, decolorized, dried, and freed of free acid may also be used.

In view of the fact that the solid dry salts of amino acids or substituted amino acids may be mixed with the starch by ordinary mixing operations, for example, in a dry blending machine, the cost of preparing the starch-salt composition for shipment and subsequent use is extremely small. In the quantities used the salts themselves are not expensive and therefore the cost of the starch-salt composition is not materially above the cost of the common starch, all of which is in contrast to the expensive modified starches heretofore used. It will be understood that whenever desired the salts may be added to the starch during the pasting operation or at any other desired time instead of being added preliminarily to the starch in dry form.

These acid salts of amino acids or substituted amino acids are not poisonous bodies and are quite water soluble. Therefore, their use in the paper and textile industries involves no hazards. Furthermore some of these acid salts are hygroscopic in nature and this property may also be used to advantage in certain starch compositions for paper coatings.

For sake of simplicity the term "amino acid" is used in the claims herein as an inclusive term to cover both the amino acids and the substituted amino acids. Likewise, the term "starch" as used in the claims herein is used in a generic sense and therefore includes the common or unmodified starches and the modified starches defined hereinabove or any desired mixture of such starches.

Various modifications and changes may be made in the materials, compositions and method of procedure described hereinabove without departing from the scope of our invention, some of the novel features of which are defined in the appended claims.

What we claim is:

1. A starch composition comprising starch admixed with an acid salt of an amino acid having the general formula

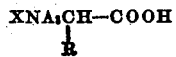

in which R is a hydrogen, an aliphatic, or aryl alkyl radical, X is a strong acid having a dissociation constant of at least about $1 \times 10^{-2}$, and A is hydrogen or alkyls, said salt being present in sufficient proportion so that when the mixture is heated with water said salt will have a substantial thinning action on the starch.

2. A starch composition comprising starch mixed with glycocol nitrate in such proportions that when the mixture is heated with water said glycocol nitrate will have a substantial thinning action on said starch.

3. A starch composition comprising starch mixed with aspartic acid sulphate in such proportions that when the mixture is heated with water said aspartic acid sulphate will have a substantial thinning action on said starch.

4. A starch composition comprising starch mixed with betaine hydrochloride in such proportions that when the mixture is heated with water said betaine hydrochloride will have a substantial thinning action on said starch.

5. A starch composition comprising starch mixed with approximately 0.5% to 5% of a solid acid salt of an amino acid having the general formula

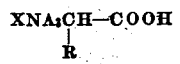

in which R is a hydrogen, an aliphatic, or aryl alkyl radical, X is a strong acid radical, and A is hydrogen or alkyls.

6. A process of producing a starch paste of relatively high starch solids content and relatively low consistency comprising heating a suspension of common starch and water to form a paste and adding to said suspension a solid acid salt of an amino acid having the general formula

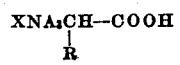

in which R is a hydrogen, an aliphatic, or aryl alkyl radical, X is a strong acid radical, and A is hydrogen or alkyls to reduce the consistency of said paste, and adding an alkali to said paste to effect neutralization and thereby stop the thinning action of said amino acid salt.

7. A starch composition comprising an admixture of starch and a solid, water soluble amino acid salt selected from the group consisting of the hydrochloric, nitric, sulphuric, phosphoric and oxalic acid salts of glycocol, aspartic acid, glutamic acid, lysine, arginine, tyrosine, phenylalanine and betaine, said salt being present in sufficient proportion to effect substantial thinning action on the starch when the starch and salt mixture is heated with water.

8. A process of producing a starch paste of relatively high starch solids content and relatively low consistency, comprising making an aqueous suspension of starch and a relatively strong solid acid salt of an amino acid having the general formula

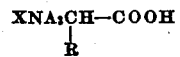

in which R is a hydrogen, an aliphatic, or aryl alkyl radical, X is a strong acid radical, and A is hydrogen or alkyls, and heating said suspension until a starch paste of desired consistency is obtained.

JAMES F. WALSH.
WILLARD L. MORGAN.